Feb. 24, 1959    A. S. CHARLAT    2,874,599
POSITIONING TABLE
Filed March 21, 1956    2 Sheets-Sheet 1

INVENTOR
ARNOLD CHARLAT
BY
ATTORNEYS

Feb. 24, 1959 A. S. CHARLAT 2,874,599
POSITIONING TABLE
Filed March 21, 1956 2 Sheets-Sheet 2

INVENTOR
ARNOLD CHARLAT
BY
*Pennie Edmonds Morton Barrows Taylor*
ATTORNEYS

United States Patent Office 2,874,599
Patented Feb. 24, 1959

2,874,599
POSITIONING TABLE

Arnold S. Charlat, Norwalk, Conn., assignor to Howe & Fant, Inc., East Norwalk, Conn., a corporation of Delaware Application March 21, 1956, Serial No. 573,053

12 Claims. (Cl. 77—64)

This invention relates to means for positioning a workpiece relative to the operating member of a machine, such as the spindle of a drilling machine, in order that an operation may be performed on the workpiece at a desired location. More particularly, the invention is concerned with a novel positioning table for supporting a workpiece, while operations are performed thereon at different places, the table being movable to shift the workpiece and capable of being exactly centered and quickly locked in its different positions. The new table offers especial advantages, when employed in connection with drilling machines of the turret type, such as that disclosed in Grimes Patent 2,364,631, issued December 12, 1944, and a form of the table suitable for use with a turret drilling machine will be illustrated and described in detail for purposes of explanation.

Drilling machines of the type shown in the Grimes patent include a single spindle and a turret carrying a plurality of tools, such as drills of different sizes, which can be brought into effective position to be driven by the spindle upon angular movement of the turret. While such turret machines can be quickly adjusted for the performance of operations with different tools, much of the advantage they afford is lost, unless the workpiece can be quickly and easily positioned relative to the spindle for the successive operations to be performed.

The present invention is directed to the provision of a universal positioning table, which can be quickly adjusted to position any one of a number of locations on a workpiece in accurate relation to the operating member of a machine, so that a plurality of different operations may be performed on the workpiece without removing it from the table. The table is of simple, relatively inexpensive construction and its operation requires little instruction or training of the operator.

For a better understanding of the invention, reference may be made to the accompanying drawings, in which Fig. 1 is a plan view of one form of the new positioning table;

Figure 1:
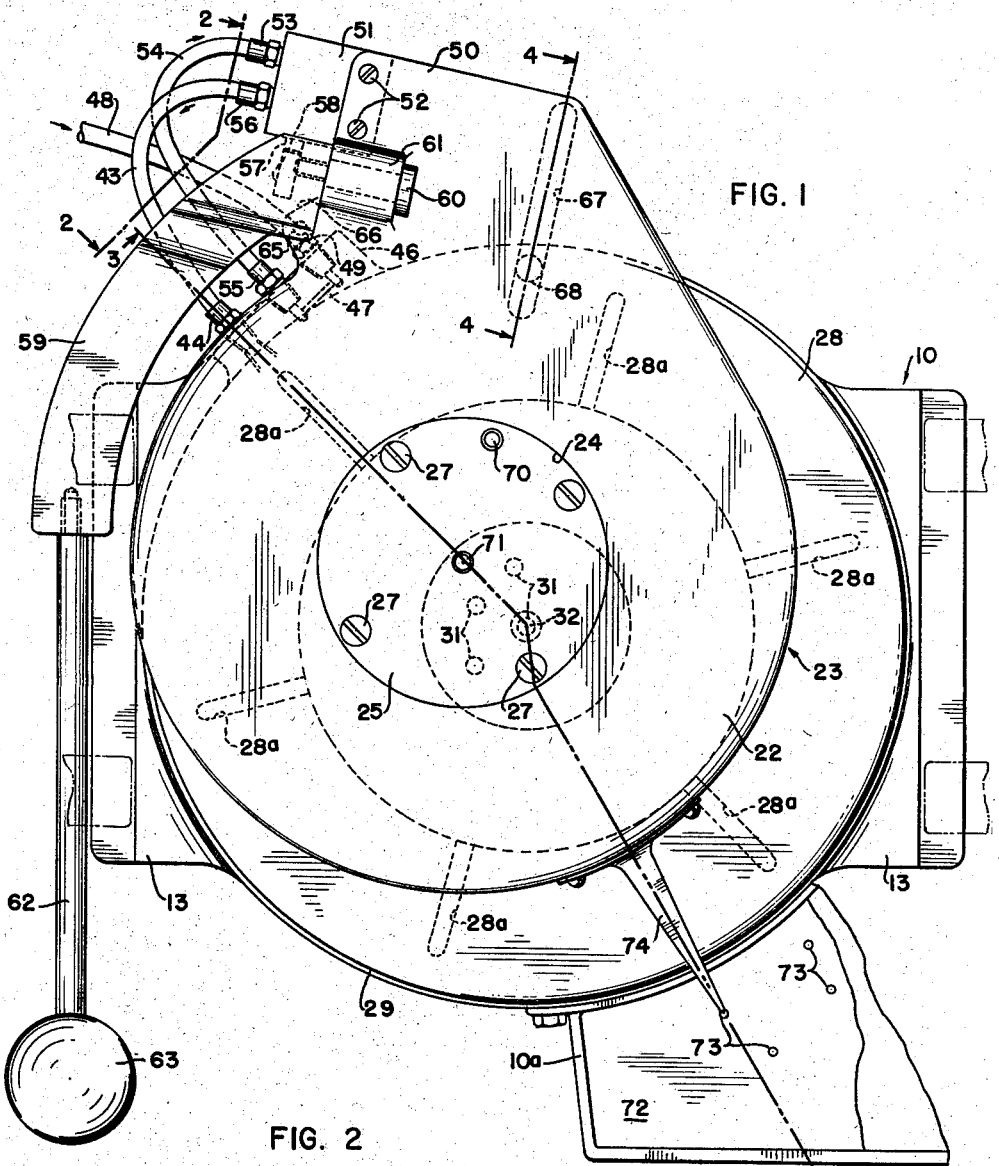
Figure 2:
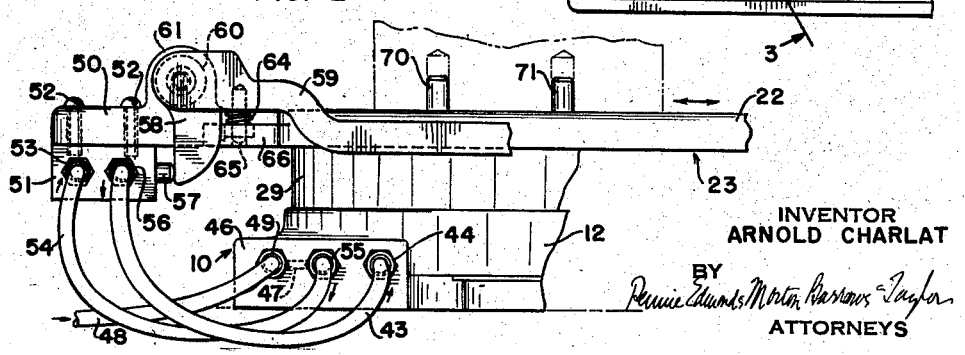
Fig. 2 is a partial sectional view on the line 2—2 of Fig. 1.
Figure 3:
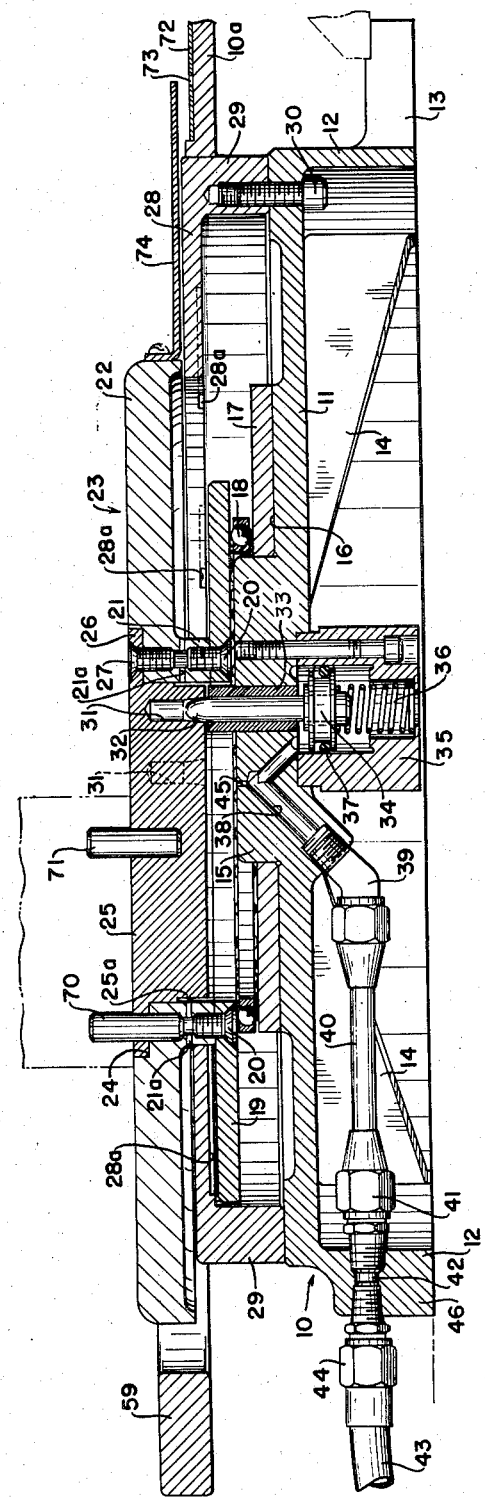
Fig. 3 is a sectional view on the line 3—3 of Fig. 1.
Figure 4:
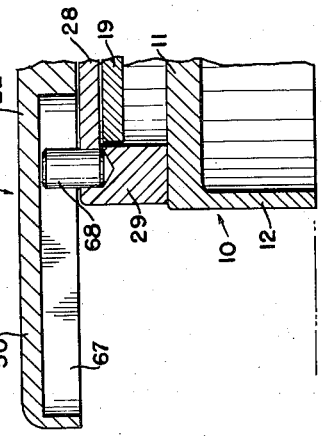
Fig. 4 is a partial sectional view on the line 4—4 of Fig. 1.

The positioning table illustrated comprises a base 10 having a top 11 supported in raised position on a peripheral flange 12 having extensions 13, by which the base may be secured rigidly on the table of the machine, with which it is to be used. The top of the base may be strengthened by ribs 14 and it is preferably formed with a central circular boss 15 surrounded by a flat annular surface 16.

The top 11 of the base is formed with a hardened annular bearing surface and, for this purpose, an annular bottom bearing plate 17 is mounted on the surface 16 of the base to encircle the boss 15 with the boss fitting the opening through the plate snugly and thus holding the plate against movement on surface 16. An annular ball thrust bearing 18 rests on the upper surface of the plate 17 and includes a plurality of balls and a retainer holding the balls separated and in the form of a ring. The bearing is of such diameter that, when it is engaged with one side of the boss, the balls at its opposite side rest upon the top of plate 17, so that the boss limits the movement of the bearing to the surface of plate 17.

An annular top bearing plate 19 rests upon the bearing 18 and is secured by screws 20 to the lower surface of a flange 21 extending downwardly around the central opening through a plate 22 of generally annular shape and forming part of the workpiece support 23. The upper surface of plate 22 is flat and it is formed with a groove 24 around the opening through the plate. A hole location plate 25 is disposed within the opening through plate 22 and plate 25 has a peripheral flange 26, which may be seated in groove 24. The hole location plate is secured in position by screws 27 extending through the flange 26 and into plate 22 and, when plate 25 is in position, its top surface is in the plane of the top surface of plate 22. A center plate 28 having a bottom peripheral flange 29 is mounted to rest on its flange on the top 11 of base 10 and is held in place by screws 30 threaded through the top of base 10 and into flange 29. The plate 28 lies at a higher level than the top bearing plate 19 and has a central opening of less diameter than plate 19, so that the plate 28 overlies plate 19 regardless of the position of the latter. The edge of the opening through plate 28 acts as a stop cooperating with the flange 21 on plate 22 to limit the horizontal movements of the workpiece support 23.

The plate 25 is provided with a plurality of openings 31 in its lower surface disposed in relative positions corresponding to the relative positions of the operations to be performed on the workpiece and the workpiece support 23 can be held in different positions with relation to the base by means of a pin 32, which is insertable into any one of the openings 31. The pin lies in the axis of the circular boss 15 on top of base 10 and is movable in a bushing 33 mounted in an axial bore through the boss. The lower end of the pin is connected to a piston 34, which lies within a cylinder 35 attached to the underside of the base beneath the boss. The piston is urged upwardly by a spring 36 seated in the cylinder below the piston and the piston has a peripheral groove containing an O-ring 37 of resilient material, which serves as a piston ring. The base is formed with a passage 38, which leads into cylinder 35 above the piston and a fitting 39 threaded into one end of the passage 38 supports one end of a fluid supply pipe 40, the other end of which is carried by a fitting 41 threaded into the inner end of a passage 42 through flange 12. An air pipe 43 is connected by a fitting 44 to the outer end of passage 42. The passage 38 has a small branch passage 45 leading into the space beneath the hole location plate 25.

An extension 46 from the outer wall of flange 12 adjacent the passage 42 through the flange is formed with a passage 47 and a pipe 48 leads from a source of air under pressure to a fitting 49 threaded into extension 46 and leading to one end of passage 47. The plate 22 of the work-piece support 23 is formed with an extension 50, to which the body of a valve 51 is attached by screws 52. A fitting 53 threaded into the valve body leads to one side of the valve member and an air pipe 54 connects fitting 53 to a fitting 55 threaded into extension 46 and leading to the other end of passage 47. A fitting 56 threaded into an opening in the valve body 51 at the downstream side of the valve member is connected to pipe 43. The valve is operable by a pin 57, which is engageable by an arm 58 connected to an operating handle 59 pivotally mounted on a pin 60 supported in a lug 61 rising from the extension 50 from the plate 22. The handle is curved to extend around the side of the workpiece support and it includes a rod 62 terminating in a ball 63, which lies forward of the base 10. In its normal position, the handle rests upon a spring 64 encircling a pin 65 in a lug 66 forming part of extension 50 of the workpiece support and the valve is closed.

A slot 67 is formed in the under surface of the annular plate 22 and its extension 50 and a pin 68 mounted in the flange 29 of center plate 28 enters the slot. The slot lies on a radius of the opening through plate 22 and is of such length that the pin 68 never hits an end of the slot regardless of the movements of the workpiece support. After the pin 32 has entered an opening in plate 25, the slot 67 and pin 68 prevent rotation of the workpiece support about pin 32 as a center, as might otherwise occur, when a drilling operation is being performed on the workpiece.

In the use of the positioning table, the workpiece is held fixed in place on the workpiece support 23 by any of the usual workpiece holders and the holder may be secured to the table as by being bolted directly to the table or may be secured to a wear plate bolted or otherwise fastened to the table. In order that the workpiece in the holder may be properly positioned with reference to the workpiece support of the table, the support is provided with a pair of locating pins 70, 71, which enter openings in the holder or wear plate and thus fix the position of the workpiece in relation to the hold positioning plate 25.

The table illustrated is provided with means for indicating the hole 31, which is centered and receives pin 32, and, for this purpose, the base 10 may be provided with an extension 10a having a flat top, on which a card 72 may be placed. The card has openings 73 in positions corresponding to the positions of openings 31 in plate 25 and a pointer 74 attached to the support 23 projects over the card and indicates the hole 73 corresponding to the opening 31 receiving pin 32. Preferably, the top of the extension 10a is blackened, so that the opening 73 through the card may be more easily seen.

In the use of the new table for centering a workpiece under the spindle of the drilling machine, a hole positioning plate 25 is first prepared. For this purpose, openings 31 are formed in the under surface of the plate and the openings correspond in number and relative position to the locations where holes are to be drilled in a workpiece in a holder secured to the support 23 and positioned by means of pins 70, 71. The plate is then mounted in the opening in plate 22 and, when the workpiece holder is secured to the support 23 and positioned by pins 70, 71, the entry of the retractable pin 32 into an opening 31 in plate 25 causes one of the hole locations on the workpiece to be aligned axially with the spindle of the machine. After a hole has been drilled at this location, the operator presses the handle 59 downwardly and this opens valve 51, so that air from the source of supply enters cylinder 35 and forces the piston 34 downwardly to withdraw pin 32 from the opening, in which it has been received. As the pin is retracted, a part of the air supplied to the cylinder escapes through the branch passage 45 into the space beneath the workpiece support. As soon as the pin 32 has been fully retracted, the operator can move the workpiece support freely on the ball bearing in the approximate direction of the next opening 31 in plate 25. The handle 59 is then swung upwardly to cut off the air supply to the cylinder, so that the spring 36 will raise the pin and cause it to bear against the bottom face of plate 25. The operator then moves the support until the pin is approximately aligned with the next opening 31, whereupon the pin, because of its shape, enters the tapered opening and, as it does so, completes the accurate positioning of the support 23 relative to the spindle. The handle 59 serves not only as a control for the air supply but also as a convenient means for shifting the support 23 and the tapered shape of the pin 32 and openings 31 facilitates the entry of the pin in any of the openings and also insures that the support will be positioned with great accuracy relative to the machine spindle.

The air, which enters the space between the top of the boss 15 and the bottom surface of the hole positioning plate 25, when valve 51 is opened to retract pin 32 to permit movement of the workpiece support, ordinarily escapes through the ball bearing 18 and between the top of plate 28 and the bottom surface of the annular plate 22 and the escaping air prevents chips from entering the space below the workpiece support 23, as the latter is being moved. When the support 23 is in approximately central position, the flow of air through passage 45 may result in the air being trapped beneath plate 25 and with little chance for the air to escape because of the small clearance between the top bearing plate 19 and the boss 15. The air so trapped might raise the workpiece support and the top bearing plate, so that the latter is forced tightly against the under surface of the center plate 28 and the workpiece support cannot be freely moved on the bearing. To avoid entrapment of the air as described, the flange 21 on the annular plate 22 may be provided with a number of radial passages 21a and the plate 25 may be reduced in diameter adjacent its lower end as indicated at 25a to provide an annular passage leading upward from the lower end of the plate to passages 21a. The center plate 28 is also provided with a plurality of radial channels 28a in its lower surface leading outward from its inner edge. With the construction described, air entering the space between the top of boss 15 and the under side of plate 25 can flow through passages 25a and 21a and enter channels 28a, so that the pressure on opposite sides of the top bearing plate 19 is equalized. Under such conditions, air cannot be trapped and the workpiece support cannot be raised by air and held against movement by engagement of the top bearing plate 19 with the center plate 28.

In the drilling of some workpieces, guide bushings for the drills may be required and such bushings may be inserted in a plate mounted on top of the work-holding device or in a bracket attached to the base 10 and overlying the support 23. When bushings are employed in a plate or bracket, the approximate hole centers on the workpiece can be readily identified by reference to the locations of the bushings, but, when bushings are not used, the card 72 and pointer 74 provide indications of the approximate locations of the hole centers and the workpiece support 23 is brought to exact position by the taper fit of pin 32 in any of the openings 31.

When a run on workpieces of one type has been completed and operations are to be performed on workpieces of another type, the hole location plate 25 previously in use is removed from the workpiece support and replaced by another having openings appropriate for the new operations. The preparation of a hole positioning plate is relatively simple and such a plate may be used for an indefinite period in the machining of workpieces, since the holes 31 are subjected to little wear by the insertion of the pin therein.

I claim:
1. A table for positioning a workpiece beneath the spindle of a machine, which comprises a base adapted to be secured in fixed position and having a flat annular bearing surface at its top, a thrust bearing resting movably on the annular bearing surface and including a plurality of balls and retainer means holding the balls in the form of a ring of a diameter substantially greater than the inner diameter of the annular bearing surface and substantially smaller than the outer diameter of said surface, means on the base limiting the horizontal movement of the thrust bearing to the area of the annular bearing surface, said limtiing means being of substantially smaller dimensions horizontally than the diameter of the ring of balls of the thrust bearing and permitting limited free movement of the thrust bearing on said bearing surface, an annular top bearing plate movably resting on the thrust bearing and having an inner diameter substantially smaller and an outer diameter substantially larger than the diameter of the ring of balls of the thrust bearing, a workpiece support above and secured to the top bearing plate, the support including a centrally disposed hole location plate of smaller transverse dimensions than the diameter of the ring of balls of the thrust bearing and having openings in relative positions corresponding to the relative positions, at which operations are to be performed on the workpiece, means on the base for restricting the horizontal movement of the top bearing plate and support, said restricting means being engageable by the top bearing plate and being of substantially greater horizontal dimensions than the plate to permit limited freedom of horizontal movement of the plate and support, and means engageable with a selected opening in the hole location plate for holding the support with the workpiece positioned relative to the machine spindle.

2. The table of claim 1, in which the limiting means is a central boss on the base extending through the open centers of the annular bearing surface and of the thrust bearing.

3. The table of claim 1, in which the workpiece support includes a plate having an opening through it and a bottom flange encircling the opening, the top bearing plate is attached to the lower end of the flange on the support plate, and the means for restricting the movement of the top bearing plate and the workpiece support is a center plate secured to the base and having a top lying between the top bearing plate and the support plate.

4. The table of claim 1, in which the top bearing plate has an opening, the hole location plate is disposed with its openings exposed through the top bearing plate opening, and the means for holding the support with the workpiece positioned relative to the machine spindle includes a pin mounted for vertical movement in the base and insertable into any of the openings in the hole location plate, the openings and pin having mating tapers, a spring urging the pin to effective position, and pneumatic means for retracting the pin, the pneumatic means including a cylinder on the base, a piston in the cylinder connected to the pin, a compressed air supply pipe mounted on the base and connected to the cylinder at one side of the piston, and a branch passage leading from the connection between the pipe and cylinder into the space within the thrust bearing and beneath the hole location plate including a cylinder on the base, a piston in the cylinder connected to the pin, and compressed air supply means mounted on the base and connected to the cylinder at one side of the cylinder, said means including a branch passage leading into the space within the thrust bearing and beneath the hole location plate.

5. The table of claim 4, in which the supply of air to the cylinder is controlled by a valve mounted on the workpiece support and the valve is operable by a handle mounted on the support and extending forward along one side of the support, the handle also serving as a means for shifting the support horizontally on the base.

6. The table of claim 4, in which the means for limiting the movements of the top bearing plate and the workpiece support is a center plate having a top lying between the top bearing plate and the workpiece support and passages are provided in the workpiece support and between the center plate and the top bearing plate to permit air flow to equalize the air pressure on opposite sides of the top bearing plate.

7. The table of claim 1, in which the support includes a plate having an opening through it and the hole location plate is removably mounted in the opening through the support plate with its top in the plane of the top of the support plate.

8. The table of claim 1, in which the means engageable with a selected opening in the hole location plate includes a pin receivable in the opening, and the support and base are connected by interfitting means permitting movement of the support relative to the base to place the openings successively in position to receive the pin, the interfitting means being disposed eccentrically relative to the support and base and co-operating with the pin, when the latter is in an opening, to prevent angular movement of the support about the pin as an axis.

9. The table of claim 8, in which the interfitting means is a slot and pin connection.

10. The table of claim 9, in which the pin is mounted on the base and the slot is formed in the support.

11. The table of claim 9, in which the slot extends radially relative to the center of the hole location plate.

12. The table of claim 1, which includes means on the workpiece support for fixing a workpiece holder on the support in proper relation to the hole location plate and the fixing means includes a pin mounted centrally in the hole location plate and a pin mounted in the support at a distance from the first pin, the pins projecting above the upper surface of the support.

References Cited in the file of this patent

UNITED STATES PATENTS

| | | |
|---|---|---|
| 1,396,302 | Wagner | Nov. 8, 1921 |
| 1,946,835 | Buhr | Nov. 14, 1929 |
| 2,536,937 | Hosea | Jan. 2, 1951 |
| 2,645,981 | Hirvonen | July 21, 1953 |

FOREIGN PATENTS

| | | |
|---|---|---|
| 253,762 | Switzerland | Nov. 16, 1948 |
| 292,868 | Switzerland | Nov. 16, 1953 |